United States Patent
Little et al.

(10) Patent No.: US 10,110,376 B1
(45) Date of Patent: Oct. 23, 2018

(54) SYSTOLIC PARALLEL GALOIS HASH COMPUTING DEVICE

(71) Applicant: SECTURION SYSTEMS, INC., Clearfield, UT (US)

(72) Inventors: Sean Little, North Salt Lake, UT (US); Jordan Anderson, Centerville, UT (US)

(73) Assignee: Securion Systems, Inc., Centrville, UT (US)

( * ) Notice: Subject to any disclaimer, the term of this patent is extended or adjusted under 35 U.S.C. 154(b) by 35 days.

(21) Appl. No.: 15/468,331

(22) Filed: Mar. 24, 2017

Related U.S. Application Data (60) Provisional application No. 62/313,890, filed on Mar. 28, 2016.

(51) Int. Cl.
*H04L 9/06* (2006.01)
*H03K 19/20* (2006.01)
*G06F 7/72* (2006.01)

(52) U.S. Cl.
CPC ............ *H04L 9/0643* (2013.01); *G06F 7/724* (2013.01); *H03K 19/20* (2013.01); *H04L 2209/12* (2013.01); *H04L 2209/125* (2013.01)

(58) Field of Classification Search
CPC ... H04L 9/0637; H04L 9/0643; H04L 9/3236; H04L 9/3242; H04L 2209/12; H04L 2209/125; G06F 7/724
See application file for complete search history.

(56) References Cited

U.S. PATENT DOCUMENTS

| | | | |
|---|---|---|---|
| 5,046,037 A | 9/1991 | Cognault et al. |
| 7,827,384 B2 | 11/2010 | Zhang et al. |
| 8,781,110 B2 | 7/2014 | Gopal et al. |
| 9,146,708 B2 | 9/2015 | Moudgill |
| 9,317,718 B1 | 4/2016 | Takahashi |
| 9,794,064 B2 | 10/2017 | Takahashi |

(Continued)

OTHER PUBLICATIONS

Mehran Mozaffari-Kermani, Arash Reyhani-Masoleh, "Efficient and High-Performance Parallel Hardware Architectures for the AES-GCM", IEEE Transactions on Computers, vol. 61, No. 8, pp. 1165-1178, Aug. 2012.*

(Continued)

*Primary Examiner* — Matthew Sandifer
(74) *Attorney, Agent, or Firm* — Greenberg Traurig LLP (57) ABSTRACT

A computing device (e.g., an FPGA or integrated circuit) processes an incoming packet comprising data to compute a Galois hash. The computing device includes a plurality of circuits, each circuit providing a respective result used to determine the Galois hash, and each circuit including: a first multiplier configured to receive a portion of the data; a first exclusive-OR gate configured to receive an output of the first multiplier as a first input, and to provide the respective result; and a second multiplier configured to receive an output of the first exclusive-OR gate, wherein the first exclusive-OR gate is further configured to receive an output of the second multiplier as a second input. In one embodiment, the computing device further comprises a second exclusive-OR gate configured to output the Galois hash, wherein each respective result is provided as an input to the second exclusive-OR gate.

20 Claims, 3 Drawing Sheets

(56) References Cited

U.S. PATENT DOCUMENTS

| | | | |
|---|---|---|---|
| 2008/0279368 A1* | 11/2008 | Yen | H04L 9/0637 380/28 |
| 2009/0080646 A1* | 3/2009 | Yen | G06F 7/724 380/28 |
| 2012/0226731 A1* | 9/2012 | Gashkov | G06F 7/724 708/620 |
| 2018/0034628 A1* | 2/2018 | Trichina | H04L 9/0631 |

OTHER PUBLICATIONS

K. M. Abdellatif, R. Chotin-Avot, H. Mehrez, "Efficient parallel-pipelined GHASH for message authentication", 2012 International Conference on Reconfigurable Computing and FPGAs, pp. 1-6, 2012.*

J. Crenne, P. Cotret, G. Gogniat, R. Tessier, J.-P. Diguet, and Tessier, "Efficient key-dependent message authentication in reconfigurable hardware," Proc. IEEE International Conference on Field-Programmable Technology (FPT), 2011, pp. 1-6.*

Abdellatif et al.; Efficient Parallel-Pipelined GHASH for Message Authentication; HAL archives-ouvertes.fr; Dec. 2012; 5 pages; France.

Satoh et al.; High-Performance Hardware Architectures for Galois Counter Mode; IEEE Transactions on Computers, vol. 58, No. 7; Jul. 2009; pp. 917-930.

Dichtl et al.; High-Speed True Random Number Generation with Logic Gates Only; 18 pages; Siemens AG and Telecom Italia; Europe.

Vasyltsov et al.; Fast Digital TRNG Based on Metastable Ring Oscillator; 17 pages; Samsung Electronics; Korea.

Wikipedia; Linear-Feedback Shift Register; downloaded from https://en.wikipedia.org/wiki/Linear-feedback_shift_register; Feb. 26, 2017; 9 pages.

Wikipedia; Physical Unclonable Function; downloaded from https://en.wikipedia.org/wiki/Physical_unclonable_function; Feb. 24, 2017; 6 pages.

* cited by examiner

Finite State Machine (4x2 Case)

FIG. 3

Transition notes:
1) New packet
2) Word length is multiple of 8
3) Word counter is at the last even count
4) Short packet (word length < N*M)
5) Null transition (always advances on the next clock)
6) Null transition

SYSTOLIC PARALLEL GALOIS HASH COMPUTING DEVICE

RELATED APPLICATIONS

This application claims priority to U.S. Provisional Application Ser. No. 62/313,890, filed Mar. 28, 2016, entitled "SYSTOLIC PARALLEL GALOIS HASH FUNCTION," by Sean Little et al., the entire contents of which application is incorporated by reference as if fully set forth herein.

FIELD OF THE TECHNOLOGY

At least some embodiments disclosed herein generally relate to hash functions, and more particularly, but not limited to, implementing a Galois hash in a computing device.

BACKGROUND

Hash functions operate by computing a value based on upon a larger set of data (e.g., a number representing a string of text). The resulting value, or hash, is typically much smaller than the larger number from which the hash is computed. A hash is reproducible, such that when the same input is processed by the same hash function, the same hash will result.

Hash functions often are implemented in hardware. This requires use of resources and/or area (e.g., of an integrated circuit) that are consumed by the hardware to implement the hash function.

SUMMARY

Systems and methods for a computing device (e.g., a security processor, a network processor, or other device) used to determine a Galois hash for an incoming data stream (e.g., incoming data packets received by a physical interface) are described herein. Some embodiments are summarized in this section.

In one embodiment, a computing device (e.g., a field programmable gate array (FPGA) or an integrated circuit) processes an incoming packet comprising data to compute a Galois hash. The computing device includes a plurality of circuits, each circuit providing a respective result used to determine the Galois hash, and each circuit comprises: a first multiplier configured to receive a portion of the data; a first exclusive-OR gate configured to receive an output of the first multiplier as a first input, and to provide the respective result; and a second multiplier configured to receive an output of the first exclusive-OR gate, wherein the first exclusive-OR gate is further configured to receive an output of the second multiplier as a second input. In one embodiment, the computing device further comprises a second exclusive-OR gate configured to output the Galois hash, wherein each respective result is provided as an input to the second exclusive-OR gate.

In one embodiment, a system computes a Galois hash for a first incoming packet comprising data, and the system includes: a plurality of sub-modules, each sub-module implemented in a computing device, and each sub-module including: a first Galois multiplier configured to receive a portion of the data; a first multiplexer configured to select one of a plurality of pre-computed keys for use by the first Galois multiplier; a first exclusive-OR gate configured to receive an output of the first Galois multiplier as a first input; and a second Galois multiplier configured to receive an output of the first exclusive-OR gate, wherein the first exclusive-OR gate is further configured to receive an output of the second Galois multiplier as a second input. The system further includes a second exclusive-OR gate, implemented in the computing device, the second exclusive-OR gate configured to provide the Galois hash as an output, wherein a result is provided by the first exclusive-OR gate of each respective sub-module, and each respective result is provided as an input to the second exclusive-OR gate.

In one embodiment, a method computes a Galois hash for a packet comprising data. The method includes: receiving, by a physical interface of a computing device, the packet; determining, by the computing device, a length of the packet in words; storing, by a word counter in a memory of the computing device, the length; computing the Galois hash in a pipeline comprising a plurality of modules, wherein the pipeline is clocked by a plurality of clock cycles, and each module comprises: a first multiplier configured to receive a portion of the data; a first exclusive-OR gate configured to receive an output of the first multiplier as a first input; and a second multiplier configured to receive an output of the first exclusive-OR gate, wherein the first exclusive-OR gate is further configured to receive an output of the second multiplier as a second input. The method further includes determining, based on the length, whether the packet is an uneven packet. In response to determining that the packet is uneven, the pipeline is configured (e.g., using a state machine) to change the parallelism of the pipeline for the last few words of the packet. This configuration change is required to compute the GNASH correctly.

The disclosure includes methods and apparatuses which perform these methods, including computing devices and systems which perform these hash functions, and computer readable media containing instructions which when executed on computing devices and systems cause the devices and systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DESCRIPTION

The following description and drawings are illustrative and are not to be construed as limiting. Numerous specific details are described to provide a thorough understanding. However, in certain instances, well known or conventional details are not described in order to avoid obscuring the description. References to "one embodiment" or "an embodiment" in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Hashing is used to verify that a given digital input stream has not been tampered with or otherwise changed in an unauthorized way. Specifically, in one embodiment, the Galois hash (GNASH) algorithm is part of the Galois Counter Mode (GCM) cryptography algorithm, which is used in many modern communication systems. The GNASH function is dependent on the GCM Galois multiply operation (GMULT).

Many algorithms implemented in hardware require an oscillating signal or "clock" to synchronize data flow between successive parts of an algorithm. Complex circuits are broken into smaller computational operations to limit the amount of work that must be done in a single clock period. The smaller the computational load between clocks, the faster the clock that can be used, and the more performance that is provided in the resulting design. The cost of dividing complex computations in this way is that not all parts of a given algorithm are available at the same instant in time. Often, if it is desirable for a given hardware implementation to be clocked at high frequency, the underlying algorithm must be altered to accommodate the latency or delay introduced by the clock divisions.

In one embodiment, the Galois multiply (GMULT) algorithm is pipelined using a systolic architecture (see, e.g., FIG. 2) such that the system can allow for arbitrary latency through the GMULT implementation. This allows for flexibility of clock frequency requirements—either a low frequency design with small chip area requirements, or a very high frequency design that requires more chip area.

In one embodiment, a Galois hash (GNASH) algorithm is implemented by using a systolic architecture to introduce parallelism into the GNASH algorithm. To describe this parallelism, a notation is here introduced: N×M. N is the number of 128-bit words that are processed per clock, and M is the number of clocks of latency required by the Galois multipliers.

In one example, a 512-bit data bus is used and a Galois multiply block requires two clocks. Thus, this is a 4×2-parallel GNASH (which requires an 8-parallel implementation). Note that in other embodiments the size of a word or portion of data can be arbitrary multiples of 128.

In one embodiment, a method of time dividing the inputs to the Galois multipliers (GMULT) is used so that the GNASH algorithm can accommodate the required latency as specified by the M input.

In one embodiment, a system is implemented with a GNASH that can consume more than a single 128-bit word per clock. This system allows for generalization of both the number of words per clock and the number of clocks of latency per GMULT.

Figure 2:
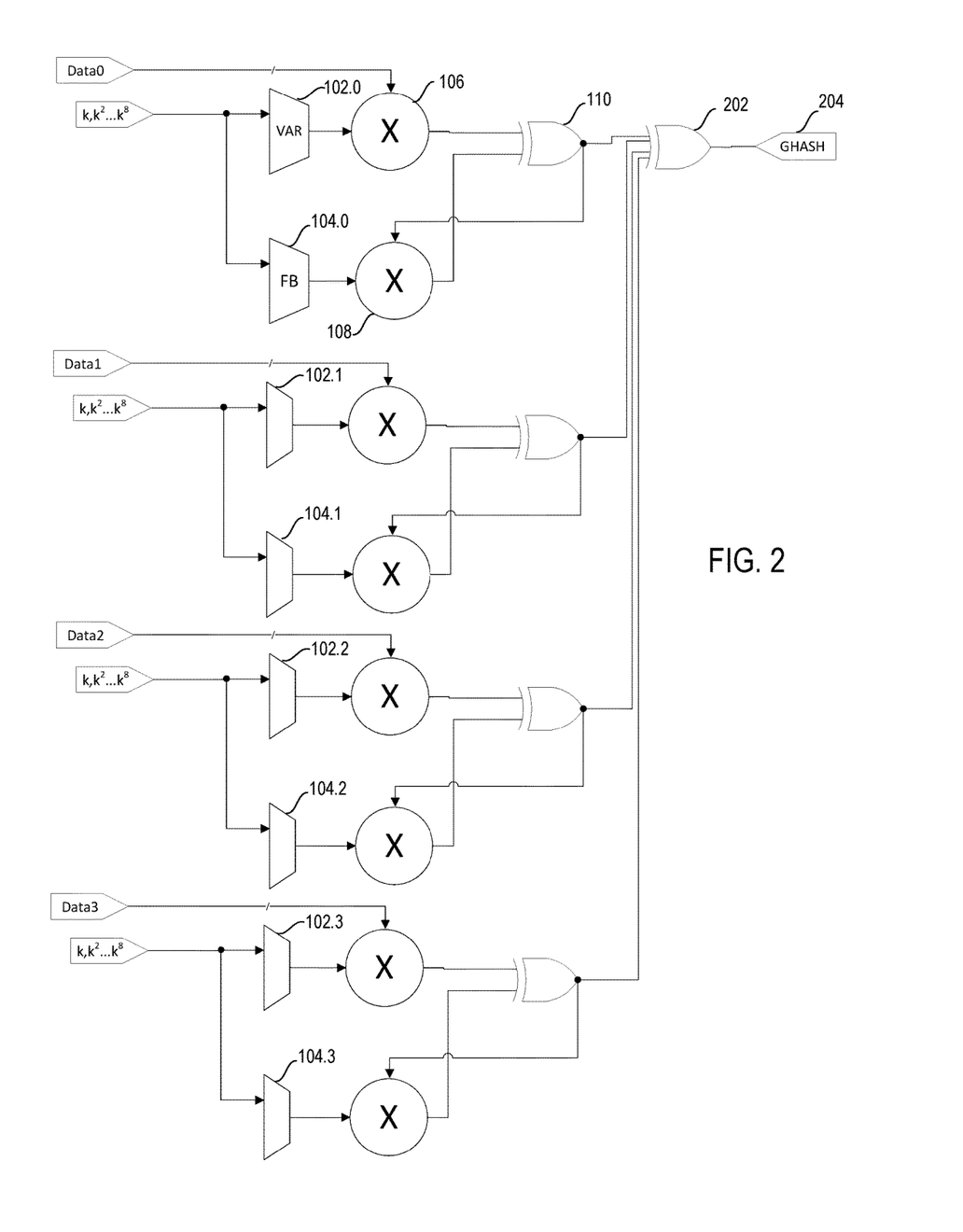
FIG. 2 shows an implementation of a computing device that uses sub-modules (as illustrated in FIG. 1) in parallel to provide a Galois hash output for the case in which four data words are processed with a clock latency of two clocks, according to one embodiment.

In one embodiment, assuming the notation N by M, where N is the number of 128-bit words consumed per clock, and M is the number of clocks of latency in each GMULT, a GNASH instance or circuit will contain N sub-modules that contain two GMULT blocks each (see, e.g., FIG. 2).

Figure 1:
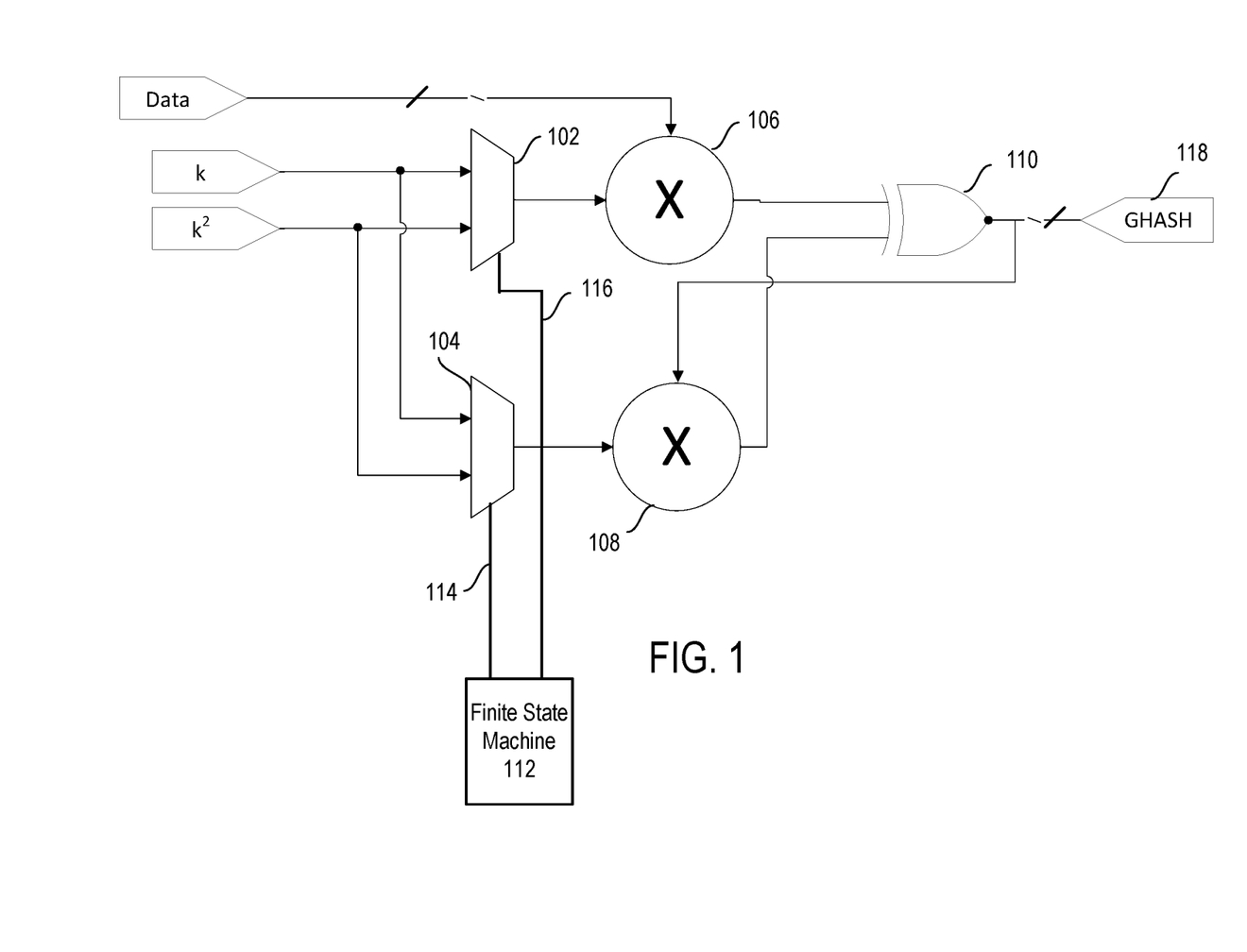
FIG. 1 shows a sub-module of a computing device to provide an intermediate result used for determining a Galois hash for incoming data, according to one embodiment (note that FIG. 1 is a full implementation of the case in which one data word is processed with a clock latency of two clocks).

High order keys $k^n$ where "n" is defined as the range of 1 to N*M are pre-computed and provided to the GNASH circuit on the first valid data input. N data word inputs are sent to each sub-module and high order key inputs are "time divided", or multiplexed based on the current time, modulo M. FIG. 1 illustrates the sub-module (note that FIG. 1 is a full implementation of the N=1, M=2, special case).

In various embodiments, the generalized systolic GNASH system above is well-suited for FPGA implementation. Because of the programmable nature of FPGAs, it is desirable to use varying bus sizes and clock frequencies as appropriate to meet the requirements of a specific design. This GNASH architecture is scalable from small, slow designs (with low resource utilization) to large designs with high-clock frequencies (with high resource utilization). For example, this system successfully synthesizes on an Altera Arria 10 FPGA for N=4, M=2 (512 bits per clock) with a clock frequency of 260 MHz (16.64 GBps).

FIG. 1 shows a sub-module that is instanced N times where M>1 (e.g., see FIG. 2), or FIG. 1 itself is the full GNASH implementation of the N=1, M=2, case, according to one embodiment. The sub-module includes multiplexers 102 and 104, Galois multipliers 106 and 108, and exclusive-OR (XOR) gate 110. In one embodiment, Galois multipliers 106 and 108 each implement a Galois multiplication operation. The number of inputs for these multiplexers is N*M.

In one embodiment, key input multiplexers 102 and 104 have select lines 114 and 116 controlled by a finite state machine 112. High order keys (k, $k^2$) are pre-computed using Galois multiplication (e.g., $k^2$=GMULT(k, k), $k^3$=GMULT(k, $k^2$), etc.). In this embodiment, the pre-computed GMULT function used here is the same GCM Galois multiply algorithm as blocks 106 and 108 in FIG. 2, but may be distinct instances of GMULT functions that are separate from blocks 106 and 108. In one non-limiting example, these key values can be pre-computed in software and stored in a RAM or other memory until needed.

In one embodiment, each of multipliers 106 and 108 is a pipelined Galois counter mode (GCM) multiplier. M is the number of clocks of latency through these multipliers, which is determined by a system's clock frequency requirements (e.g., either a low frequency design with small chip area requirements, or a high frequency design that requires more chip area). XOR gate 110 is, for example, a two-input 128-bit XOR gate.

Regarding multiplexer 104, in one embodiment for the case of M=1, blocks 104, 108, 110 and the mirrored blocks (e.g., as shown in FIG. 2) in the other instances of the sub-module are removed. This particular embodiment may not be practical for some high throughput designs where the multipliers need more than one clock to achieve a high clock frequency.

FIG. 2 shows a parallel GNASH (4×2 case), according to one embodiment. The circuit of FIG. 2 includes multiple sub-modules, each as is illustrated in FIG. 1. There are 4 sub-modules shown in FIG. 2 because N=4. The number of sub-modules will vary for other cases in which N is other than 4.

The outputs from each sub-module (each output is an intermediate result) are provided to an exclusive-OR gate 202. This is an N-input XOR gate. The output from XOR gate 202 is provided as a Galois hash output for use, for example, by a Galois hash block (which may be implemented as a circuit in an FPGA). In one embodiment, this Galois hash is defined as a 128-bit value. Note that a state machine 112 as illustrated in FIG. 1 is used to control the sub-modules of FIG. 2, but is not shown in the drawing for ease of illustration.

In one embodiment, the above system is specified using a hardware description language (HDL), and is made on FPGA hardware using industry standard synthesis tools such as Altera Quartus II or Xilinx Vivado. In other embodiments, the system can be manufactured as an ASIC or another type of integrated circuit.

Various systems and methods for implementing a Galois-based hash in general are disclosed in U.S. Pat. No. 7,827,384 ('384 patent), issued Nov. 2, 2010, to Zhang et al. and titled "Galois-based incremental hash module," which patent is hereby incorporated herein by reference in its entirety. The '384 patent generally describes a method that computes a hash of a string of an input stream. The hash is computed by performing one or more Galois mathematical operations upon portions of the string.

Figure 3:
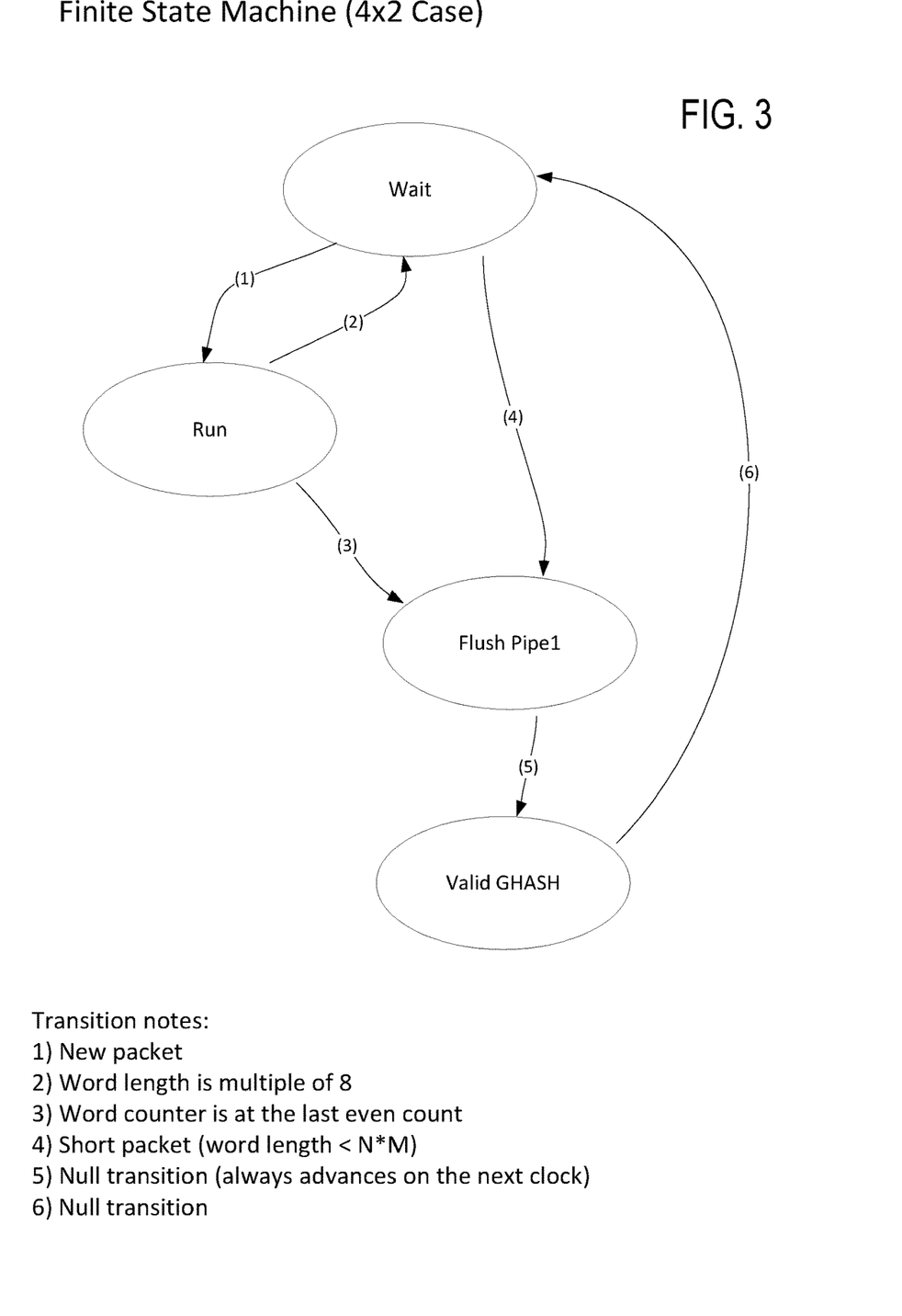
FIG. 3 illustrates a finite state machine used to control processing of the Galois hash in the computing devices of FIG. 1 or 2, according to one embodiment.

In various embodiments, the system of the present disclosure described above, merely as a non-limiting example, does not need feedback from Hash Pipeline0 to Hash Pipeline1, etc., as specifically described in FIG. 3 of U.S. Pat. No. 7,827,384. Instead, such various embodiments of the present disclosure provide pipelines that run in parallel.

In various embodiments, pipelines of the present disclosure run in parallel. More specifically, the Data0, Data1, Data2, Data3 inputs (see, e.g., FIG. 2) are the 128-bit blocks of the full 512-bit input for the 4×2 case. The individual sub-modules are pipelines that run independently of each other. In contrast, merely as a non-limiting example, FIG. 3 of U.S. Pat. No. 7,827,384 suggests that the illustrated second pipeline requires input from the illustrated first pipeline.

In the system of the present disclosure (e.g., the 4×2 case of FIG. 2), all four sub-modules provide a result at substantially the same instant in time, and the correct GNASH result is provided from the XOR of the four outputs from these four sub-modules.

FIG. 3 illustrates a finite state machine (e.g., state machine 112 of FIG. 1) that is used to control the GNASH pipeline above (e.g., the 4×2 case discussed earlier), according to one embodiment. In other embodiments, different state machine designs, and even other types of circuits (e.g., a circuit on a separate chip or a microprocessor coupled to a chip including the GNASH pipeline) can be used to provide this control.

For the 4×2 case (and other cases), the finite state machine depicted in FIG. 3 is used to account for incoming packets of arbitrary size. The parallel GNASH algorithm works most efficiently when the size of the input packet is a multiple of 8. If the size of the input packet is a multiple of 8, the algorithm can immediately accept a new packet because the GNASH output is immediately valid. Hence transition (2) in FIG. 3 moves back to the wait state without flushing the pipeline.

The 4×2 case has two main controls that must be manipulated by the state machine. The key that is passed to the input data Galois multipliers (depicted in FIG. 2, labels 102.x) will henceforth be referred to as the "variable key". The key that is passed to the feedback data Galois multiplier (depicted in FIG. 2, labels 104.x) will be referred to henceforth as the "feedback key". During "normal" operation, meaning a packet is larger than 8 words, and the algorithm is currently processing the part of the packet before the last modulo 8 words, the feedback key is constant for all multipliers and set to $Key^8$. The variable keys varies for all the multipliers and oscillates between inputs according to the following pattern:

| Clock | Variable Keys (labels 104.0-104.3) |
|---|---|
| Even clocks | $Key^8$, $Key^7$, $Key^6$, $Key^5$ |
| Odd clocks | $Key^4$, $Key^3$, $Key^2$, Key |

If the input packet is not a multiple of 8, the packet can be defined as "uneven", and the pipeline must be reconfigured during the last modulo 8 words to correctly compute the remaining hash values. In order to keep track of when the pipeline needs to run "normally" and when this reconfiguration needs to be performed, a word counter (e.g., stored in an FPGA register) is employed to count the number of 128-bit input words. At the end of an uneven packet, the parallelism of the algorithm is changed by controlling the multiplexers in FIG. 2 appropriate to the number of remaining words in the packet. The variable and feedback keys are configured according to the following table for each of the modulo 8 possibilities (note that the 5-7 cases require two clocks to flush the pipeline):

| Remaining 128-bit Words | Feedback Key (constant for all multiplier muxes) | Variable Keys (indexed from the top of FIG. 2 down) |
|---|---|---|
| 1 | Key | Key, 0, 0, 0 |
| 2 | $Key^2$ | $Key^2$, Key, 0, 0, 0 |
| 3 | $Key^3$ | $Key^3$, $Key^2$, Key, 0 |
| 4 | $Key^4$ | $Key^4$, $Key^3$, $Key^2$, Key |
| 5 | $Key^5$ | (even clock): $Key^5$ $Key^4$, $Key^3$, $Key^2$ (odd clock): Key, 0, 0, 0 |
| 6 | $Key^6$ | (even clock): $Key^6$ $Key^5$, $Key^4$, $Key^3$ (odd clock): $Key^2$ Key, 0, 0, 0 |
| 7 | $Key^7$ | (even clock): $Key^7$ $Key^6$, $Key^5$, $Key^4$ (odd clock): $Key^3$ $Key^2$, Key, 0 |

This allows the pipeline to be flushed and the correct GNASH output to be computed.

In one embodiment, the finite state machine resets and reconfigures the pipeline when a new packet arrives, and the word counter is reset to zero. Note that the length of the packet is required to be known at the first word of the incoming packet.

In one non-limiting example, the following Python code implements the 4×2 embodiment (this assumes that "gmult" function exists that implements the Galois multiply with the desired irreducible polynomial) (also, note that k1, k2 . . . k8 are the high order keys. h_var and h_fb are the key inputs into the multipliers):

```
def ghash_parallel_4x2(key, data, len_words):
    k1 = key
    k2 = gmult(key, key)
    k3 = gmult(key, k2)
    k4 = gmult(key, k3)
    k5 = gmulnkey, k4)
    k6 = gmulnkey, k5)
    k7 = gmulnkey, k6)
    k8 = gmulnkey, k7)
    h_var = [[k8, k4], [k7, k3], [k6, k2], [k5, k1]]
    md = len_words % 8
    t0 = [0, 0]
    t1 = [0, 0]
    t2 = [0, 0]
```

-continued

```
t3 = [0, 0]
num_words = 0
mask = int('ff' * 16, 16)
h_vec_assend = [k1, k2, k3, k4, k5, k6, k7, k8]
h_vec_desend = [k7, k6, k5, k4, k3, k2, k1, 0, 0, 0, 0, 0, 0, 0, 0]
h_fb = h_vec_assend[-1]
# we must force an additional clock through the design for
mod 1,2,3,4
# packets
clocks = len(data) + int(md > 0 and md < 5)
for i in range(clocks):
    d = data[i]if i < len(data) else 0
    # alternate between clocks
    ind = i % 2
    fb0 = t0[ind]
    fb1 = t1[ind]
    fb2 = t2[ind]
    fb3 = t3[ind]
    if num_words > = (len_words - md):
        h_fb = h_vec_assend[md - 1]
        begin = 7 - md
        if ind == 1:
            begin += 4
        for ii in range(4):
            h_var[ii][ind] = h_vec_desend[begin + ii]
    i00 = gmult(d >> 384, h_var[0][ind])
    i01 = gmult(fb0, h_fb)
    t0[ind] = i00 ^ i01
    i10 = gmult((d >> 256) & mask, h_var[1][ind])
    i11 = gmult(fb1, h_fb)
    t1[ind] = i10 ^ i11
    i20 = gmult((d >>128) & mask, h_var[2][ind])
    i21 = gmult(fb2, h_fb)
    t2[ind] = i20 ^ i21
    i30 = gmult(d & mask, h_var[3][ind])
    i31 = gmult(fb3, h_fb)
    t3[ind] = i30 ^ i31
    num_words += 4
result = t0[0] ^ t0[1] ^ \
         t1[0] ^ t1[1] ^ \
         t2[0] ^ t2[1] ^ \
         t3[0] ^ t3[1]
return result
```

In various non-limiting specific examples, the above design is most efficient when the input data stream has Q input data words (each word is 128 bits), where Q is evenly divisible by N*M. Since for most applications of the GNASH, this constraint cannot be guaranteed, the systolic arrays of the GNASH multipliers are reconfigured during the last M clocks of the data stream in a mathematically correct way. Therefore, sufficient complexity is provided in a control finite state machine to reconfigure the systolic arrays appropriately. In this context, "systolic array" is synonymous with "pipeline", where mathematical computation is broken up by clock delay.

As one particular example, note that if the input data stream can always be guaranteed to have Q data words, the input multiplexers in the sub-module (multiplexers 102 and 104) are less complicated (M:1 multiplexers instead of N*M:1), as for the general control of the GNASH implementations above.

In one embodiment, the key inputs (k, $k^2$, etc.) are changed by the state machine. The state machine configures the systolic array differently for the last 7 words. This is done to flush or read out the pipeline so the correct GNASH result is provided.

References [1] and [2] below each present alternative approaches for realizing a parallel GNASH on FPGA hardware, and each hereby incorporated by reference herein in their entirety.

Reference [1]: *High-Performance Hardware Architectures for Galois Counter Mode*, Akashi Satoh, Takeshi Sugawara, and Takafumi Aoki, IEEE Computer Society, IEEE Transactions on Computers, Vol. 58, No. 7, July 2009.

Reference [2]: *Efficient Parallel-Pipelined GHASH for Message Authentication*, Karim Moussa Ali Abdellatif, Roselyne Chotin-Avot, Habib Mehrez. International Conference on Reconfigurable Computing and FPGAs (ReConFig), December 2012, Mexico. pp. 1-6, 2012.

Various Additional Embodiments

Various additional embodiments (each numbered using numbers 1-20) are now presented below.

1. A system to compute a Galois hash for a first incoming packet comprising data, the system comprising:
   a plurality of sub-modules, each sub-module implemented in a computing device, and each sub-module comprising:
   a first Galois multiplier 106 configured to receive a portion of the data (e.g., Data0);
   a first multiplexer 102 configured to select one of a plurality of pre-computed keys (k, $k^2$, . . . ) for use by the first Galois multiplier;
   a first exclusive-OR gate 110 configured to receive an output of the first Galois multiplier as a first input; and
   a second Galois multiplier 108 configured to receive an output of the first exclusive-OR gate, wherein the first exclusive-OR gate is further configured to receive an output of the second Galois multiplier as a second input; and
   a second exclusive-OR gate (e.g., gate 202), implemented in the computing device, the second exclusive-OR gate configured to provide the Galois hash as an output (GNASH in FIG. 2), wherein a result is provided by the first exclusive-OR gate of each respective sub-module, and each respective result is provided as an input to the second exclusive-OR gate.

2. The system of embodiment 1, wherein the computing device is a field programmable gate array or an application specific integrated circuit.

3. The system of embodiment 1, further comprising a memory to store a plurality of incoming packets, including the first incoming packet.

4. The system of embodiment 3, further comprising an interface to receive the incoming packets, and a buffer comprising the memory, wherein the buffer is coupled to the interface and stores the incoming packets prior to processing by the plurality of sub-modules.

5. The system of embodiment 3, further comprising at least one processor, wherein the at least one processor is configured to perform security operations for the incoming packets, the security operations comprising at least one function that uses the Galois hash output from the second exclusive-OR gate.

6. The system of embodiment 1, wherein the respective result from each sub-module is computed in parallel.

7. The system of embodiment 1, wherein each of the plurality of pre-computed keys is computed, prior to receiving the first incoming packet, using Galois multiplication.

8. The system of embodiment 1, further comprising a state machine (e.g., finite state machine 112) configured to control selection by the first multiplexer of the one pre-computed key.

9. The system of embodiment 8, further comprising a second multiplexer 104 configured to select, under control of the state machine, a pre-computed key for use by the second Galois multiplier.

10. The system of embodiment 8, further comprising a word counter, wherein the state machine is further configured to count, using the word counter, a number of input words of a predetermined bit size in an incoming packet.

11. The system of embodiment 10, wherein the plurality of sub-modules are part of a processing pipeline, and the state machine is further configured to, when a new packet is received, reset the word counter and flush the processing pipeline.

12. A field programmable gate array (FPGA) for processing an incoming packet comprising data to compute a Galois hash, the FPGA comprising a plurality of circuits, each circuit providing a respective result used to determine the Galois hash, and each circuit comprising:
  a first multiplier configured to receive a portion of the data;
  a first exclusive-OR gate configured to receive an output of the first multiplier as a first input, and to provide the respective result; and
  a second multiplier configured to receive an output of the first exclusive-OR gate, wherein the first exclusive-OR gate is further configured to receive an output of the second multiplier as a second input.

13. The FPGA of embodiment 12, further comprising a second exclusive-OR gate configured to output the Galois hash, wherein each respective result is provided as an input to the second exclusive-OR gate.

14. The FPGA of embodiment 13, wherein each circuit further comprises a first multiplexer configured to select a pre-computed key for use by the first multiplier.

15. The FPGA of embodiment 14, wherein the first multiplexer comprises a plurality of inputs, each input corresponding to a respective pre-computed key of a plurality of pre-computed keys, wherein a number of the pre-computed keys is determined as a number of words processed in a clock cycle multiplied by a number of clock cycles of latency for the first multiplier.

16. The FPGA of embodiment 14, wherein each circuit further comprises a second multiplexer configured to select a pre-computed key for use by the second multiplier.

17. A method of computing a Galois hash for a packet comprising data, the method comprising:
  receiving, by a physical interface of a computing device, the packet;
  determining, by the computing device, a length of the packet in words;
  storing, by a word counter in a memory of the computing device, the length; computing the Galois hash in a pipeline comprising a plurality of modules,
    wherein the pipeline is clocked by a plurality of clock cycles, and each module comprises:
    a first multiplier configured to receive a portion of the data;
    a first exclusive-OR gate configured to receive an output of the first multiplier as a first input; and
    a second multiplier configured to receive an output of the first exclusive-OR gate, wherein the first exclusive-OR gate is further configured to receive an output of the second multiplier as a second input;
  determining, based on the length, whether the packet is an uneven packet; and
  in response to determining that the packet is uneven, configuring the pipeline to correctly finish the parallel GNASH computation.

18. The method of embodiment 17, further comprising providing the Galois hash as an output from a second exclusive-OR gate, wherein a result is provided by the first exclusive-OR gate of each respective circuit, and each respective result is provided as an input used by the second exclusive-OR gate to determine the Galois hash.

19. The method of embodiment 17, further comprising, receiving data from a new packet by the first multiplier every clock cycle of the plurality of clock cycles, and when a new packet is received, resetting the word counter and flushing the pipeline (e.g., the "Flush Pipe1" state of FIG. 3).

20. The method of embodiment 17, further comprising:
  calculating, prior to receiving the packet, a plurality of pre-computed keys;
  storing, in a memory, the pre-computed keys for use as inputs by the first multiplier and the second multiplier; and selecting, using a state machine, a pre-computed key for the first multiplier and the second multiplier.

Closing

In one embodiment, the circuits for computing the Galois hash above are made in a computing device using FPGAs or ASICs, for example, by programming or implementing the circuits described above using a high-level design language, such as VHDL or Verilog.

Although some of the drawings may illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that various stages or components could be implemented in hardware, firmware, software or any combination thereof.

At least some aspects disclosed can be embodied, at least in part, in software. That is, the techniques may be carried out in a computer system or other data processing system in response to its processor(s), such as a microprocessor, executing sequences of instructions contained in a memory, such as ROM, volatile RAM, non-volatile memory, cache or a remote storage device.

In various embodiments, hardwired circuitry (e.g., one or more hardware processors or other computing devices) may be used in combination with software instructions to implement the techniques above (e.g., the system may be implemented using one or more computing devices). Thus, the techniques are neither limited to any specific combination of hardware circuitry and software nor to any particular source for the instructions executed by the data processing system.

In one embodiment, a computing device may be used that comprises an inter-connect (e.g., bus and system core logic), which interconnects a microprocessor(s) and a memory. The microprocessor is coupled to cache memory in one example.

The inter-connect interconnects the microprocessor(s) and the memory together and also interconnects them to a display controller and display device and to peripheral devices such as input/output (I/O) devices through an input/output controller(s). Typical I/O devices include mice, keyboards, modems, network interfaces, printers, scanners, video cameras and other devices which are well known in the art.

The inter-connect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE-1394 peripherals.

The memory may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system such as the computing device above is used to implement the GNASH pipeline and/or state machine.

In one embodiment, a data processing system such as the computing device above is used to implement a user terminal, which may provide a user interface for control of a computing device. For example, a user interface may permit configuration of the GNASH circuit or state machine. A user terminal may be in the form of a personal digital assistant (PDA), a cellular phone or other mobile device, a notebook computer or a personal desktop computer.

In some embodiments, one or more servers of the data processing system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) and/or the memory above. For example, the functionalities described can be partially implemented via hardware logic in the microprocessor(s) and partially using the instructions stored in the memory. Some embodiments are implemented using the microprocessor(s) without additional instructions stored in the memory. Some embodiments are implemented using the instructions stored in the memory for execution by one or more general purpose microprocessor(s). Thus, the disclosure is not limited to a specific configuration of hardware and/or software.

In this description, various functions and operations may be described as being performed by or caused by software code to simplify description. However, those skilled in the art will recognize what is meant by such expressions is that the functions result from execution of the code by a processor, such as a microprocessor.

Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Hardware and/or software may be used to implement the embodiments above. The software may be a sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

Software used in an embodiment may be stored in a machine readable medium. The executable software, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

No claim element herein is to be construed under the provisions of 35 U.S.C. 112, sixth paragraph, unless the element is expressly recited using the phrase "means for."

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system to compute a Galois hash for a first incoming packet comprising data, the system comprising:
    a plurality of sub-modules, each sub-module implemented in a computing device, and each sub-module comprising:
        a first Galois multiplier configured to receive a portion of the data;
        a first multiplexer configured to select one of a plurality of pre-computed keys for use by the first Galois multiplier;
        a first exclusive-OR gate configured to receive an output of the first Galois multiplier as a first input; and
        a second Galois multiplier configured to receive an output of the first exclusive-OR gate, wherein the first exclusive-OR gate is further configured to receive an output of the second Galois multiplier as a second input; and
    a second exclusive-OR gate, implemented in the computing device, the second exclusive-OR gate configured to provide the Galois hash as an output, wherein a result is provided by the first exclusive-OR gate of each respective sub-module, and each respective result is provided as an input to the second exclusive-OR gate.

2. The system of claim 1, wherein the computing device is a field programmable gate array or an application specific integrated circuit.

3. The system of claim 1, further comprising a memory to store a plurality of incoming packets, including the first incoming packet.

4. The system of claim 3, further comprising an interface to receive the incoming packets, and a buffer comprising the memory, wherein the buffer is coupled to the interface and stores the incoming packets prior to processing by the plurality of sub-modules.

5. The system of claim 3, further comprising at least one processor, wherein the at least one processor is configured to perform security operations for the incoming packets, the security operations comprising at least one function that uses the Galois hash output from the second exclusive-OR gate.

6. The system of claim 1, wherein the respective result from each sub-module is computed in parallel.

7. The system of claim 1, wherein each of the plurality of pre-computed keys is computed, prior to receiving the first incoming packet, using Galois multiplication.

8. The system of claim 1, further comprising a state machine configured to control selection by the first multiplexer of the one pre-computed key.

9. The system of claim 8, further comprising a second multiplexer configured to select, under control of the state machine, a pre-computed key for use by the second Galois multiplier.

10. The system of claim 8, further comprising a word counter, wherein the state machine is further configured to count, using the word counter, a number of input words of a predetermined bit size in an incoming packet.

11. The system of claim 10, wherein the plurality of sub-modules are part of a processing pipeline, and the state machine is further configured to, when a new packet is received, reset the word counter and flush the processing pipeline.

12. A field programmable gate array (FPGA) for processing an incoming packet comprising data to compute a Galois hash, the FPGA comprising:
    a plurality of circuits, each circuit providing a respective result used to determine the Galois hash, and each circuit comprising:
        a first Galois multiplier configured to receive a portion of the data;
        a first exclusive-OR gate configured to receive an output of the first Galois multiplier as a first input, and to provide the respective result; and
        a second Galois multiplier configured to receive an output of the first exclusive-OR gate, wherein the first exclusive-OR gate is further configured to receive an output of the second Galois multiplier as a second input; and
    a second exclusive-OR gate configured to generate the Galois hash based on the respective results.

13. The FPGA of claim 12, wherein each respective result is provided as an input to the second exclusive-OR gate.

14. The FPGA of claim 13, wherein each circuit further comprises a first multiplexer configured to select a pre-computed key for use by the first Galois multiplier.

15. The FPGA of claim 14, wherein the first multiplexer comprises a plurality of inputs, each input corresponding to a respective pre-computed key of a plurality of pre-computed keys, wherein a number of the pre-computed keys is determined as a number of words processed in a clock cycle multiplied by a number of clock cycles of latency for the first Galois multiplier.

16. The FPGA of claim 14, wherein each circuit further comprises a second multiplexer configured to select a pre-computed key for use by the second Galois multiplier.

17. A method of computing a Galois hash for a packet comprising data, the method comprising:
    receiving, by a physical interface of a computing device, the packet;
    determining, by the computing device, a length of the packet in words;
    storing, by a word counter in a memory of the computing device, the length;
    computing the Galois hash in a pipeline comprising a plurality of modules, wherein the pipeline is clocked by a plurality of clock cycles, and each module comprises:
        a first Galois multiplier configured to receive a portion of the data;
        a first exclusive-OR gate configured to receive an output of the first Galois multiplier as a first input and to provide a respective result; and
        a second Galois multiplier configured to receive an output of the first exclusive-OR gate, wherein the first exclusive-OR gate is further configured to receive an output of the second Galois multiplier as a second input;
    determining, based on the length, whether the packet is an uneven packet; and
    in response to determining that the packet is uneven, configuring the pipeline in order to complete computing of the Galois hash; and
    providing the Galois hash as an output from a second exclusive-OR gate based on the respective results provided by the first exclusive-OR gates.

18. The method of claim 17, wherein each respective result is provided as an input used by the second exclusive-OR gate to determine the Galois hash.

19. The method of claim 17, further comprising, receiving data from a new packet by the first Galois multiplier every clock cycle of the plurality of clock cycles, and when a new packet is received, resetting the word counter and flushing the pipeline.

20. The method of claim 17, further comprising:
calculating, prior to receiving the packet, a plurality of pre-computed keys;
storing, in a memory, the pre-computed keys for use as inputs by the first Galois multiplier and the second Galois multiplier; and
selecting, using a state machine, a pre-computed key for the first Galois multiplier and the second Galois multiplier.

* * * * *

UNITED STATES PATENT AND TRADEMARK OFFICE
CERTIFICATE OF CORRECTION

PATENT NO. : 10,110,376 B1
APPLICATION NO. : 15/468331
DATED : October 23, 2018
INVENTOR(S) : Little et al.

It is certified that error appears in the above-identified patent and that said Letters Patent is hereby corrected as shown below:

On the Title Page

In item (73), under "Assignee", in Column 1, Line 1, delete "Centrville," and insert -- Centerville, --, therefor.

In the Specification

In Column 2, Line 31, delete "GNASH" and insert -- GHASH --, therefor.

In Column 3, Line 21, delete "(GNASH)" and insert -- (GHASH) --, therefor.

In Column 3, Line 23, delete "GNASH" and insert -- GHASH --, therefor.

In Column 3, Line 47, delete "(GNASH)" and insert -- (GHASH) --, therefor.

In Column 3, Line 49, delete "GNASH" and insert -- GHASH --, therefor.

In Column 3, Line 56, delete "GNASH" and insert -- GHASH --, therefor.

In Column 3, Line 61, delete "GNASH" and insert -- GHASH --, therefor.

In Column 3, Line 64, delete "GNASH" and insert -- GHASH --, therefor.

In Column 4, Line 4, delete "GNASH" and insert -- GHASH --, therefor.

In Column 4, Line 7, delete "GNASH" and insert -- GHASH --, therefor.

In Column 4, Line 13, delete "GNASH" and insert -- GHASH --, therefor.

Signed and Sealed this
Twenty-sixth Day of February, 2019

Andrei Iancu
*Director of the United States Patent and Trademark Office*

CERTIFICATE OF CORRECTION (continued)
U.S. Pat. No. 10,110,376 B1

In Column 4, Line 18, delete "GNASH" and insert -- GHASH --, therefor.

In Column 4, Line 26, delete "GNASH" and insert -- GHASH --, therefor.

In Column 4, Line 58, delete "GNASH" and insert -- GHASH --, therefor.

In Column 5, Line 39, delete "GNASH" and insert -- GHASH --, therefor.

In Column 5, Line 43, delete "GNASH" and insert -- GHASH --, therefor.

In Column 5, Line 48, delete "GNASH" and insert -- GHASH --, therefor.

In Column 5, Line 52, delete "GNASH" and insert -- GHASH --, therefor.

In Column 5, Line 56, delete "GNASH" and insert -- GHASH --, therefor.

In Column 6, Line 42, delete "GNASH" and insert -- GHASH --, therefor.

In Column 6, Line 60, delete "gmulnkey, k4)" and insert -- gmult(key, k4) --, therefor.

In Column 6, Line 61, delete "gmulnkey, k5)" and insert -- gmult(key, k5) --, therefor.

In Column 6, Line 62, delete "gmulnkey, k6)" and insert -- gmult(key, k6) --, therefor.

In Column 6, Line 63, delete "gmulnkey, k7)" and insert -- gmult(key, k7) --, therefor.

In Column 7, Line 43, delete "GNASH," and insert -- GHASH, --, therefor.

In Column 7, Line 44, delete "GNASH" and insert -- GHASH --, therefor.

In Column 7, Line 55, delete "GNASH" and insert -- GHASH --, therefor.

In Column 7, Line 60, delete "GNASH" and insert -- GHASH --, therefor.

In Column 7, Line 63, delete "GNASH" and insert -- GHASH --, therefor.

In Column 8, Line 36, delete "(GNASH" and insert -- (GHASH --, therefor.

In Column 10, Line 3, delete "GNASH" and insert -- GHASH --, therefor.

In Column 11, Line 23, delete "GNASH" and insert -- GHASH --, therefor.

In Column 11, Line 29, delete "GNASH" and insert -- GHASH --, therefor.

CERTIFICATE OF CORRECTION (continued)
U.S. Pat. No. 10,110,376 B1

In the Claims

In Column 14, Line 53, in Claim 17, delete "packet; and" and insert -- packet; --, therefor.